Oct. 13, 1942.   J. MIHALYI   2,298,403
APPARATUS FOR TAKING FLASHLIGHT PICTURES
Filed March 21, 1940   2 Sheets-Sheet 1
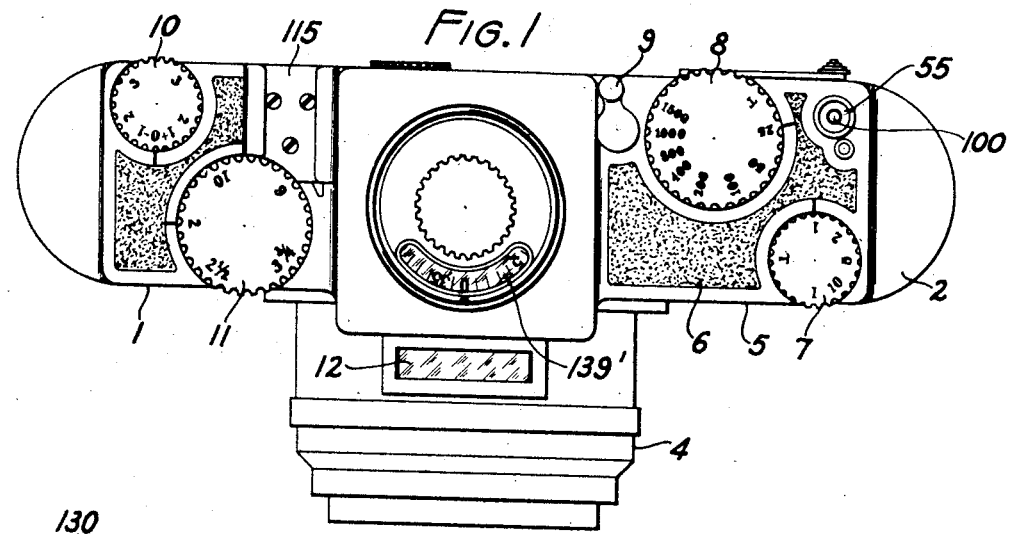
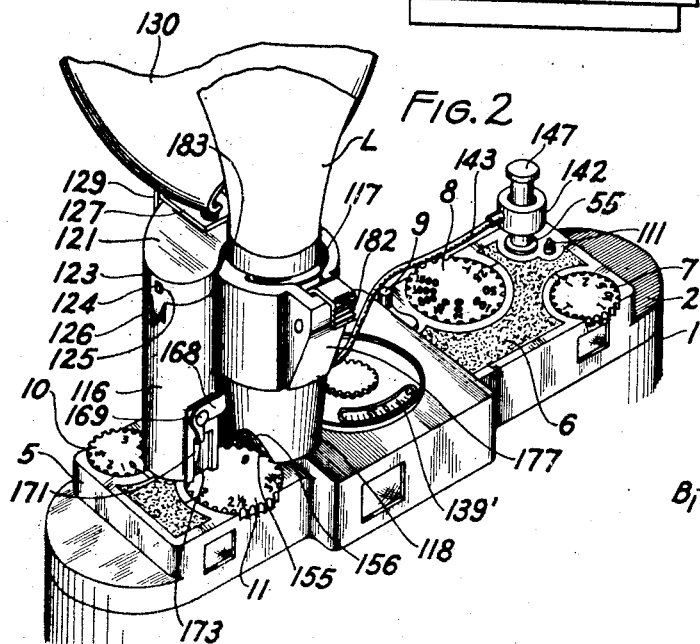
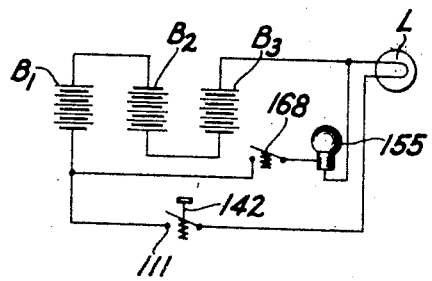
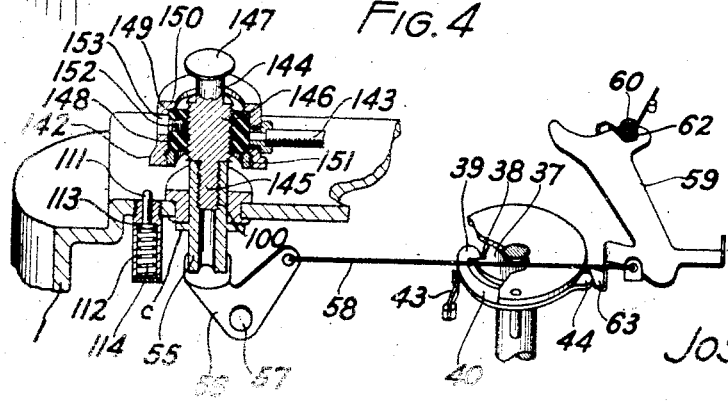
JOSEPH MIHALYI
INVENTOR
BY *Newton M. Perrins*
*Earl T. [illegible]*
ATTORNEYS Oct. 13, 1942.                    J. MIHALYI                    2,298,403
                   APPARATUS FOR TAKING FLASHLIGHT PICTURES
                          Filed March 21, 1940          2 Sheets-Sheet 2
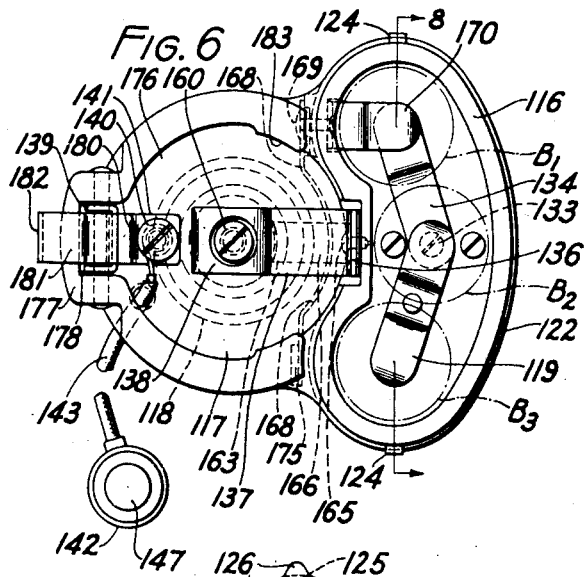
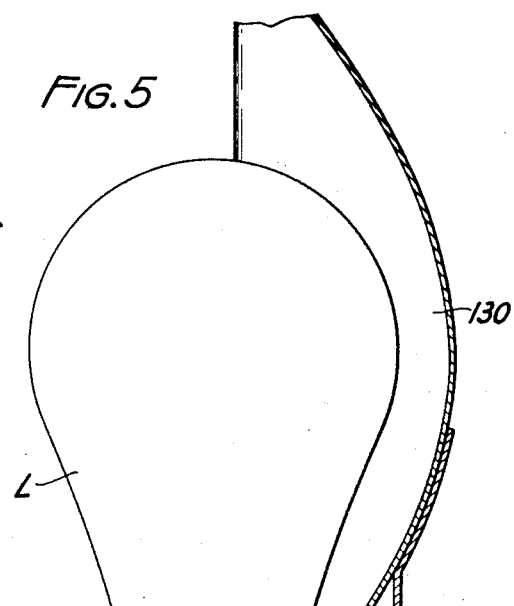
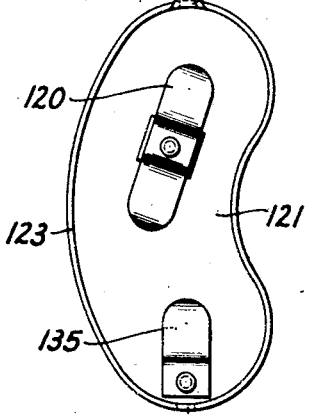
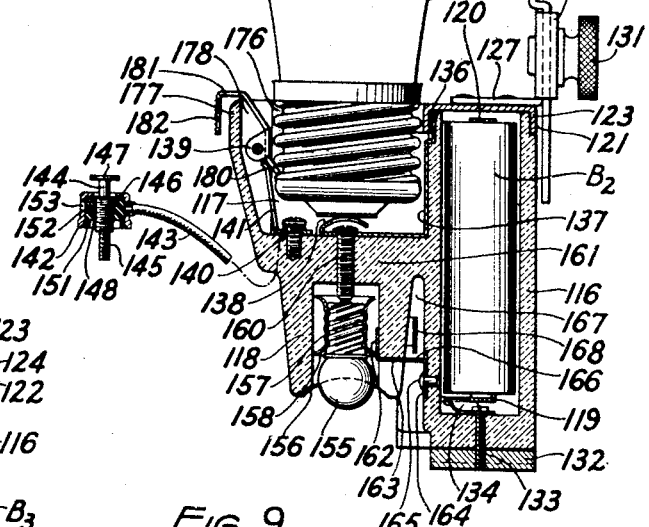
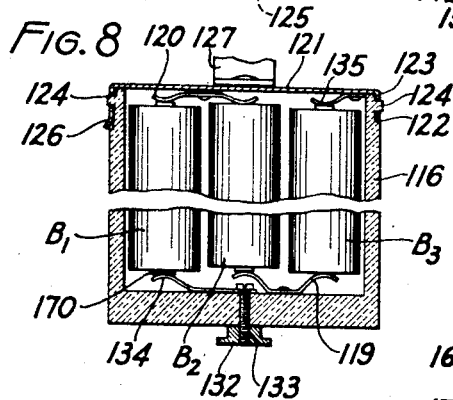
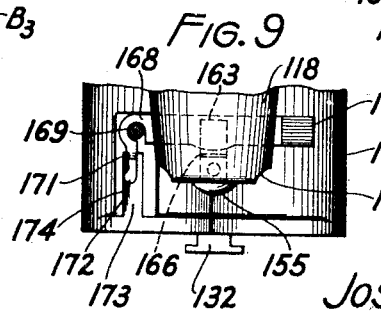
JOSEPH MIHALYI
INVENTOR
BY
ATTORNEYS Patented Oct. 13, 1942

2,298,403

UNITED STATES PATENT OFFICE 2,298,403

APPARATUS FOR TAKING FLASHLIGHT PICTURES

Joseph Mihalyi, Rochester, N. Y., assignor to Eastman Kodak Company, Rochester, N. Y., a corporation of New Jersey Application March 21, 1940, Serial No. 325,171

7 Claims. (Cl. 67—29)

The present invention relates to a flash light synchronizing apparatus for cameras, and more particularly to such an apparatus wherein the flash lamp circuit is partially contained in a camera and partially contained in a flash unit adapted to be detachably connected to the camera.

The present invention relates to a flash light synchronizing apparatus for cameras and more particularly to such an apparatus wherein one switch contact of the flash lamp circuit is a part of a camera and adapted to be electrically connected to the remainder of the f ash lamp circuit contained in a flash unit upon attachment of the unit to the camera, and the other switch contact of the lamp circuit is a part of said flash unit adapted to be detachably connected to the shutter release member of a camera for engaging said first-mentioned contact to close the circuit when the shutter release member is moved to release the camera shutter.

One object of the present invention is the provision of a flash light synchronizing apparatus in which one switch contact of the flash lamp circuit is a part of the camera itself, and the other switch contact is physically connected to, and a part of, a flash unit separate from said camera and housing the batteries and flash lamp, and which switch contact is adapted to be detachably mounted on the camera shutter release member to move therewith into engagement with said first switch contact to close the flash lamp circuit in timed relation with the opening of the camera shutter.

Another object of the present invention is to provide means for adjusting the two switch contacts on the parts on which they are mounted for the purpose of synchronizing the release of the shutter and the flashing of the lamp in accordance with the operating characteristics of a particular shutter and the flashing characteristics of a given flash lamp.

And another object is to provide a flash synchronizing apparatus of the type described including a flash unit separable from the camera and adapted to be detachably mounted thereon, said flash unit including a battery, or other source of current, connected to said unit so that one terminal thereof is adapted to be automatically connected to said switch contact on the camera when the unit is attached to said camera.

And yet another object is to provide a flash unit of the type described which includes a flash lamp socket permitting a lamp to be inserted into, or removed from, the same without rotation of the lamp, and including means for releasably locking a lamp in the same.

And still another object is to provide a flash unit of the type described having a socket for the reception of a low voltage bulb for illuminating the top of the camera when the unit is mounted thereon, said socket being connected in parallel with a flash lamp socket and controlled by a normally open, manually operated, switch.

And another object is the provision of a flash unit which is extremely compact and simple in construction, pleasing in appearance, and easily and rapidly attached to a camera adapted for use therewith.

The novel features that I consider characteristic of my invention are set forth with particularity in the appended claims. The invention itself, however, both as to its organization and its methods of operation, together with additional objects and advantages thereof, will best be understood from the following description of a specific embodiment when read in connection with the accompanying drawings in which:

Fig. 1 is a top plan view of a photographic camera adapted to use a flash unit constructed in accordance with the present invention, Fig. 2 is a perspective view of the top of a camera with the flash unit attached thereto for taking flashlight pictures, Fig. 3 is a wiring diagram of the flash synchronizing apparatus, Fig. 4 is a fragmentary perspective view partially in section, showing the switch contact forming a part of the flash unit connected to the shutter release member of the camera, and showing the relation of the same to the switch contact forming a part of the camera prior to a release of the camera shutter, Fig. 5 is an enlarged vertical section of the flash unit showing the relation of the battery casing, the flash lamp socket, the low voltage bulb socket, and the electrical connections for the same, Fig. 6 is a top plan view of the flash unit with the cover and batteries removed from the battery casing, and the flash lamp removed from its socket, Fig. 7 is a plan view of the underside of the cover for the battery casing, Fig. 8 is a section taken substantially on line 8—8 of Fig. 6, and Fig. 9 is a front elevation of the lower part of the flash unit, and showing in detail the manually operable switch in the circuit of the low voltage socket.

Like reference characters refer to corresponding parts throughout the drawings.

Briefly, the present synchronizing apparatus comprises the combination of a camera having one switch contact and a shutter release member thereon, and a flash unit adapted to be detachably connected to the camera and including the source of current, and a flash lamp socket and the second switch contact connected in series, the switch contact on the camera adapted to be automatically connected to the battery in series with the elements of the flash unit when the unit is attached to the camera, and said other switch contact adapted to be detachably connected to the shutter release member to move therewith and into engagement with the switch contact on the camera to close the lamp circuit. The flash unit includes a rapid-change socket for the flash lamp, and also includes a low voltage bulb connected in a normally opened circuit in parallel with the flash lamp socket, and which bulb may be turned on at will to illuminate the dials on the top of the camera to render them clearly visible and to indicate the potential of the source of current in the flash unit.

The synchronizing apparatus constituting the present invention may be adapted for use with any camera having a reciprocal shutter release member normally moved to an inoperative position and to which the switch contact forming a part of the flash unit may be detachably mounted. However, for the purpose of illustrating a specific application of the present invention, I have chosen to show it in combination with a camera having a shutter and shutter release of the type disclosed in my copending patent application Serial No. 212,269, filed June 7, 1938, now Patent No. 2,203,657 dated June 4, 1940.

Referring to Figs. 1, 2, and 3, the camera may comprise a metal camera body indicated generally by the numeral 1 having a top wall 2 and a focusing objective in a suitable mounting unit 4. The top wall 2 carries a metal housing, or superstructure 5, within which most of the shutter control parts are arranged and on the upper surface 6 of which are mounted the various manual controls or setting dials, which include the slow speed and time exposure selector 7, the high speed selector 8, the delayed exposure setting lever 9, and other dials 10 and 11 connected with the range finding and lens compensating adjustment. The top of the housing 5 also includes an exposure indicating dial 139', while the upper surface of the lens mounting includes a window 12 through which the focusing and diaphragm scales on the lens mount are visible.

Extending through, and slidably mounted relative to, the top of the housing 5 is a shutter release member 55, the lower end of which contacts a bellcrank 56 pivoted at 57. The release member 55 may be provided with a flange C to prevent the member from sliding out of the camera body and to limit the outward movement thereof. One arm of the bellcrank is connected by a rigid link 58 to a horizontally movable lever 59 pivoted at 60 in the housing 5. The lever 59 is normally moved counter-clockwise by the spring 62 so that the shutter release member 55 is normally moved to an extended position relative to the top of the camera, see Fig. 2. For the purpose of pointing out how a depression of the shutter release member 55 releases the shutter, it will suffice to say that the shutter is normally held in a tensioned condition when the nose 39 on the pawl 40 engages the shoulder 38 on the collar 37, this pawl being normally spring pressed to the position shown in Fig. 4 by a spring 43. The pawl is pivoted to release the nose 39 from engagement of the shoulder 38 when the lever 59 is pivoted clockwise by a depression of the shutter release member 55, the turned down lug 63 on the lever 59 engaging the ball end 44 on the pawl 40 to effect such a movement of the same. So far as the present invention is concerned only the described operation of the shutter release is essential to an understanding of the same, but if a full description of the shutter mechanism itself is desired for any reason, the same can be had by referring to my above noted copending patent application wherein the same is fully disclosed. The shutter release member 55 may be solid as shown in my referred to copending application, or it may be tubular as shown in Fig. 4, and threaded at 100 at its upper end for the reception of a cable release in which case the cable of the cable release will pass through the shutter release member to directly contact the bellcrank to release the shutter. When no cable release is being used, the shutter is released by pressing downwardly upon the release member 55 directly, sliding the same relative to the camera, and when the camera is used in this manner the upper end of the release member may be closed by a plug adapted to be threaded into the same.

Coming now to the present invention, and referring to Figs. 1, 2, and 3, the top of the housing 5 may be provided with a switch contact 111 disposed adjacent the shutter release member 55. The switch contact is adapted to be electrically connected to the metal camera body, and be adjustable relative thereto in the direction of movement of the shutter release member for the purpose hereinafter described. This may be accomplished by slidably mounting the contact in a shell 112 threaded into the top of the housing 5, where a flange 113 thereon engages a shoulder in the shell, said contact being normally urged in an upward direction by a coil spring 114. A channel-shaped metal accessory clip 115 is bolted to the top of the camera housing 5 and is in electrical contact with the switch contact 111 through the medium of the metal camera body. It is pointed out that the present invention is in no way limited to the particular accessory attaching means, or the electrical connection between the same and the switch contact 111 shown, but the accessory attachment means could be of any desired form and could be electrically connected to the switch contact 111 by a metal conductor strip in the event the camera body were of a material other than metal. This switch contact 111 and attaching means 115 on the camera electrically connected to one another are the only parts of the camera, exclusive of the shutter release member, which form a part of the complete flash synchronizing apparatus constituting the present invention.

The remainder of the flash synchronizing apparatus constitutes a flash unit entirely separate from, but adapted to be detachably mounted on, the camera, and which will now be described. Referring to Figs. 2–9, and particularly to Fig. 5, the flash unit comprises a battery casing 116, a flash lamp socket 117, and a socket 118 for a low voltage electric bulb, all molded as a unit from an insulating material such as Bakelite, or other suitable plastic material. The battery casing 116 is adapted to contain a source of current sufficient to set off a flash lamp, and which in the present instance comprises three 1½-volt batseries B1, B2, and B3, arranged in side by side relation. The batteries are adapted to be connected in series by the metal strips 119 and 120 engaging opposite terminals of adjacent batteries. The metal strip 119 is fixed directly to the bottom of the battery casing, while the metal strip 120 is connected to, and insulated from, the metal cover 121 adapted to be removably mounted in covering relation with the open end of the battery casing, see Figs. 7 and 8. The upper edge of the battery casing is recessed, as clearly shown at 122 in Figs. 6, 7, and 8, to receive a downwardly extending flange 123 around the edge of the cover; and the cover is held onto the battery casing by the engagement of the two nibs 124, extending at right angles to the side wall of the casing on opposite ends thereof, and perforations 125 in the flange and the cover. The flange 123 is provided with a turned out ear 126 adjacent one of the perforations thereon, see Figs. 7 and 8, which may be flexed outwardly to disengage the perforation from the nib engaged thereby to permit a removal of the cover from the battery casing.

Attached to the cover 121 by rivets, or other suitable means, is an L-shaped bracket 127 having a channel section 128 in which an arm 129 supporting a reflector 130 is adapted to be slidably mounted. The channel section 128 may be provided with a clamping screw 131 for releasably clamping the reflector and its arm in any desired position of vertical adjustment relative to the top of the battery casing, and for adapting the reflector for use with different sizes of flash lamps.

A metal foot 132 shaped to slidably engage the accessory clip 115 on the camera is fastened to the bottom of the battery casing by bolts 133 for the purpose of detachably mounting the flash unit on the top of the camera, see Fig. 2. The negative terminal of battery B1 is grounded to the metal foot through the metal contact strip 134, and one end of one of the bolts 133 so that when the flash unit is mounted on the camera one side of the flash circuit will be automatically electrically connected to the switch contact 111 on the camera.

The positive terminal of the battery B3 is directly connected to the metal cover through the contact strip 135 mounted on the cover. The cover when placed on the battery casing is adapted to engage the protuberance 136 on the conductor strip 137 extending from the recess in the upper edge of the battery casing into the flash lamp socket 117 where it ends in a turned-up resilient end 138 in the bottom of the socket, and which end 138 forms a socket contact adapted to engage the center contact in the bottom of the flash lamp L when the same is inserted into the socket. The flash lamp socket includes a second contact 139 adapted to engage the metal shell on the base of a lamp inserted into the socket, whereby the two socket contacts are adapted to be connected in series through the filament of the lamp inserted into said socket. This second contact 139 is electrically connected to a binding post 140 in the base of the socket by a spring contact strip 141 engaging and normally forcing said second contact into engagement with the shell on the base of the lamp.

The second switch contact 142 is physically and electrically connected to the binding post 140 by the insulated electrical conductor 143. This second switch contact is adapted to be detachably connected with the shutter release member 55 to move therewith and into engagement with the first switch contact 111 to close the flash lamp circuit in timed relation with the release of the camera shutter. To this end an attaching screw 144 is provided, said attaching screw having a reduced threaded end 145 adapted to threadably engage the threaded socket 100 in the shutter release member 55 normally provided for the reception of the cable release, see Fig. 4. The attaching screw 144 includes an enlarged threaded part 146 and a finger-piece 147 upon which the operator may press to move the shutter release member 55 downwardly to release the shutter. In threaded engagement with the part 146 of the attaching screw 144 is an insulating collar 148 which serves as a connector for adjustably attaching the switch contact to the attaching screw and as a means for insulating the switch contact from the attaching screw to prevent a short circuit of the flash lamp circuit.

The second switch contact 142 may be of a form best shown in Fig. 4, and may comprise an annular ring having a groove 149 formed by an inwardly extending flange 150 on the top thereof and a ring 151 threaded into the lower end thereof, and in which groove the collar 148 is rotatably mounted relative to the contact. It is desirable that the switch contact be rotatable relative to the attaching screw 144 so that the screw can be readily threaded into the shutter release member without the insulating conductor 143 tending to rotate the contact whereupon the conductor 143 would become twisted and tangled. At the same time it is necessary that there be no relative movement between the two when moved longitudinally to release the camera shutter, and the described connection between the two satisfies both of these requirements.

To synchronize the flashing of a lamp with the opening of a shutter when using a synchronizing apparatus where one switch contact is carried by the shutter actuating member there are two, and sometimes three, time lags which must be considered and accounted for. First, there is the movement of the shutter release member necessary to release the shutter, secondly there is the time necessary for the shutter to fully open after release, and third, there is the lag characteristic of the lamp, or stating it differently, the time between the actual completion of the flash lamp circuit and the time the bulb reaches its maximum illumination. Referring to the present shutter release structure, it will be noticed that the shutter release member 55 must be moved a considerable distance before the bellcrank 56, the rigid link 58, and the lever 59 are moved sufficiently to release the nose 39 of the pawl 40 from the shoulder 38 of the collar 37. During this movement the switch contact 142 is necessarily moving toward the other switch contact 111 on the camera, and if the two contacts are not properly spaced from one another, the lamp circuit may be closed too soon, or too late, with respect to the shutter release.

The particular mounting of the two switch contacts 111 and 142 on the respective parts supporting the same provide for an adjustment of the contacts to account for the mentioned time lags to insure proper synchronization. The ineffective movement of the shutter release member of any camera will be characteristic of each individual camera and can be accounted for as a factory adjustment of the switch contact 111 on the camera body into and out of the same relative to the contact on the shutter release member when the same is in its inoperative position. Such an adjustment of the switch contact 111 can be effected by rotation of the shell 112, carrying said contact, into and out of the camera housing, see Fig. 4. The switch contact 142 will always assume a given position relative to the switch contact 111 on the camera on the shutter release of which it is mounted due to the fact that the lower end of the enlarged threaded part 146 and the attaching screw 144 associated therewith will be brought into engagement with the top edge of the shutter release member 55. By adjusting the collar 148 along the attaching screw 144 the relative position of the switch contact 142 to the switch contact 111 can be changed to insure the lamp circuit being closed in proper timed relation with the release of the shutter to give perfect synchronization. The collar 148, and along with it the switch contact 142, can be locked in adjusted position on the attaching screw by the set screw 152 available through the opening 153 in the side wall of the switch contact. It has been found that due to the lag characteristics of the given flash lamp, e. g., .020 of a second, the lamp circuit should be completed a given time prior to the actual release of the shutter to insure the shutter being opened at the time the lamp is at its maximum brilliance. After the switch contacts 111 and 142 have been adjusted on the camera and attaching screw 144, respectively, to insure proper synchronization with a given lamp, it will be understood that they will assume these positions every time the switch contact 142 is placed on the shutter release member 55. It is pointed out that the adjustment of the switch contact on the part supporting the same is a factory adjustment, so that all that is required of the operator is to attach the contact 142 forming a part of the flash unit to the shutter release member 55 and he is assured that correct synchronization will result.

Flashlight pictures are usually taken in places where the light is so dim that the operator has difficulty in setting the several dials on the top of his camera in preparation for taking a picture. It is not always convenient for a photographer to light a match, or turn on a hand flashlight, to make the necessary adjustments of the dials or to observe their position, for two hands are generally required to manipulate and hold a camera. Therefore, for the purpose of illuminating the dials on the top of the camera, I have provided the flash unit with a small voltage bulb 155 which is normally directed toward the top of the camera and can be manually turned on with one finger of a hand holding the camera thereby leaving the other hand free to make any necessary adjustments of the dials as might prove necessary. In addition to serving this purpose, the brilliance of the bulb 155 will serve to indicate the potential remaining in the batteries at any time. This information is important because it is a well-known fact that if the potential of the batteries gets too low they will not set off the lamp. In addition, when the potential of the batteries reach a certain low level it takes longer for the lamp to flash after completion of the circuit thereof than when the potential is at the value it should be, with the result that the synchronization of an apparatus adjusted for strong batteries will be inaccurate when the batteries become weak.

To this end the flash unit is equipped with the socket 118 for a low voltage electric bulb 155, said socket being directed downwardly toward the foot of the flash unit so that the bulb will illuminate the side of the camera on which the unit is mounted, see Figs. 2 and 5. The lower end of the wall of the socket 118 may be cut away as best shown at 156 so that the rays of the light from the bulb 155 will pass to the extreme ends of the wall of the camera on which the flash unit is mounted. The bulb 155 is adapted to be screwed into a threaded shell 157 the edges of which are flared out as shown at 158 to bite into the plastic material of which the socket is composed when the same is forced into said socket under pressure. The bulb 155 is connected in a normally open circuit in parallel with a flash lamp socket 117, see Fig. 3, and which circuit includes a normally open, manually operated, switch.

Referring to Figs. 5 and 9, the manner of connecting the bulb 155 in parallel with a flash lamp socket will now be described. A bolt 160, the head of which is in contact with the conductor 137 in the base of the flash lamp socket, extends through the partition 161 between the sockets and into the center of the shell 157 to electrically engage the center contact in the base of the bulb 155 when screwed into the shell. The shell is adapted to electrically engage one end 162 of a Z-shaped metal strip 163, extending along the wall of the socket, the other end 164 of the strip being riveted to the battery casing at 165, and the intermediate portion 166 of the strip extending across the space 167 between the socket and the battery casing. The normally open switch of the bulb circuit comprises a metal arm 168 pivoted, and electrically connected, to a pin 169 extending through the battery casing and electrically connected to the negative terminal of the battery B1 through the contact strip 170. Thus when the arm 168 is moved downwardly into engagement with the intermediate portion 166 of the Z-shaped contact strip the bulb circuit will be closed and the bulb will light. It is desirable to have this switch normally open to be manually operated only when it is desired to illuminate the top of the camera, or test the potential of the batteries. While this may be accomplished in any number of ways, I have shown the pivoted end of the arm provided with a resilient tail 171 formed in the shape of a Z so that the end 172 thereof is adapted to extend into a recess 173 formed in the wall of the battery casing and engage one wall 174 thereof. This tail 171 is so formed, and located relative to the wall 174 of the recess engaged thereby, that its resiliency tends to swing the arm upwardly about its pivot, or to a circuit opening position, see Fig. 9. The arm 168 extends from behind the socket 118 so that the finger-piece 175 thereof will be accessible for closing the circuit.

It is always desirable to be able to change the flash lamps in the flash lamp socket in a quick and easy manner for reasons well known to those in the art. To this end I have provided the present flash unit with a quick-change flash lamp socket which permits the lamp to be pushed directly into the socket where it is automatically releasably locked in the proper position against removal, and from which it can be pulled upon release of the lock therefor. The locking means for the socket comprises a pivoted spring pressed lever which is adapted to engage the threads on the base of the lamp, and which lever is connected to the flash lamp circuit so that it forms one of the socket contacts.

Referring now to Figs. 2, 5, and 6, the quick-change socket forming a part of the present flash unit comprises a socket 117 having a circular open end 176 slightly greater in diameter than the base of the lamp it is to receive so that the lamp can be directly pushed into, or pulled out of, the same. One portion of the wall of the socket is built out as shown at 177 and is provided with a recess 178 extending to the bottom of the interior of the socket and being in communication therewith. Pivotally mounted in the recess 178 is a latch member 139 one end 180 of which is adapted to extend into the socket to engage the upper side of the threads on the base of a lamp to positively prevent its being pulled from the socket. The other end 181 of the latch member extends to the outside of the socket and provides an accessible finger-piece 182 for pivoting the latch member to its inoperative, or releasing, position. The contact strip 141 is preferably made of a spring material so that it will normally force the end 180 of the latch member toward the interior of the socket in addition to electrically connecting said latch member into the flash lamp circuit so that it becomes one electrical contact of the socket.

The end 180 of the latch member is normally directed toward the bottom of the socket, as best shown in Fig. 5, so that it will not prevent a lamp from being pushed into the socket, but will be pushed into the recess 178 upon such insertion of a lamp. However, when a lamp has been pushed clear into the socket the end 180 of the latch member 139 snaps into the groove between two threads and positively holds the lamp in the socket. It will be readily appreciated that the amount the end 180 of the latch member 139 can pivot into the casing will be limited due to the fact that the end 181 comes into contact with the upper edge of the built-out portion 177 on the socket wall, and that the greater the force tending to remove the lamp from the socket, the greater will be the locking action of the latch member. The resiliency inherent in the contact 138 in the base of the socket 117 normally tends to force the lamp out of the socket and against the latch member so that the lamp will be firmly held in the socket. In order to more securely position the lamp in the socket, I have provided the upper edge of the same with two radial projections 183 accurately spaced from one another on the periphery of the socket and disposed on the sides of the socket opposite from the latch member, see Figs. 2 and 6. These projections do not extend into the socket a sufficient distance to prevent a lamp from being pushed directly into, or pulled from, the socket, but are adapted to engage the groove between two threads on the base of a lamp when the same is pushed theretoward by the spring action of the latch member. In order to remove the lamp from the socket it is only necessary to press inwardly upon the finger-piece 182 of the latch member. This will cause the end 180 of the latch member to be retracted from engagement with the base of the lamp whereupon the resiliency of the contact 138 will tend to eject the lamp from the socket to a certain extent, after which the lamp may be entirely removed from the socket by a straight pull thereon.

The operation and use of a flash synchronizing apparatus constituting the present invention may be set out briefly as follows: When it is desired to take flash pictures with a camera adapted for use with the disclosed flash unit, that part of the unit including the battery casing 116, the flash lamp socket 117, and the socket 118 for the illuminating bulb 155, is attached to the top of the camera by sliding the foot 132 on the lower end of the battery casing into the accessory clip 115 on the camera. This automatically electrically connects the switch contact 111 on the camera with one terminal of the battery in the lamp circuit. The switch contact 142 physically connected to, and forming a part of, the flash unit is then connected to the shutter release member 55 of the camera by screwing the end of the attaching screw 144 into the end of said member 55 as far as it will go. This mounting of the switch contact 142 on the shutter release member 55 insures the two switch contacts being properly spaced to insure synchronization, the necessary adjustments of the switch contacts on the parts supporting the same having been previously made as a factory adjustment, so that the apparatus is ready for operation pending the insertion of a flash lamp and a low voltage bulb in their respective sockets. The flash lamp may be pushed directly into its socket where it will be automatically and releasably locked in proper position, and the low voltage bulb 155 will have been screwed into its socket 118. Now if the picture is to be taken in a dimly lighted place, and the camera parts must be adjusted, the operator may depress the switch arm 168 with one finger to complete the circuit of the low voltage bulb to illuminate the top of the camera and the dials necessary to adjusting the camera parts. This bulb will also serve to indicate by its brilliancy whether the potential of the batteries is suitable for proper operation of the apparatus, or whether they should be changed for new ones.

After the camera parts have been set to the desired position, the switch arm 168 may be released whereupon it will move to its normal circuit opening position and the bulb will be extinguished. All that remains to be done is to depress the shutter release member 55 by pressing upon the finger-piece 147, and the switch contact 142 will be moved with said shutter release member and into engagement with the switch contact 111 on the camera to close the flash lamp circuit in proper timed relation with the release of the shutter to insure synchronization. To take a second picture in rapid succession all that is necessary is to press inwardly upon the finger-piece 182 on the front of the socket to release the lamp, pull out the burned lamp, push a new one into its place. It will be noticed that the parts of the flash unit are so compactly arranged that the switch for turning on the lamp to illuminate the camera top, and the finger-piece for releasing the lamp from the socket, can each be operated by a finger on the hand holding the camera, whereby the other hand is left free for adjusting the dials on the top of the camera, to handle the flash lamp during the changing thereof, or for any other purpose which might present itself.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention what I claim is new and desire to secure by Letters Patent of the United States is:

1. The combination with a camera having a reciprocal shutter actuating member extending from the interior thereof, a first contact extending from said camera adjacent said member and mounted to move relative to said camera, means normally acting on said contact to move it in one direction, and an attaching means on said camera and electrically connected to said first contact, of a flash lamp unit including a part engaging said attaching means for detachably mounting said unit on said camera body, and electrically connected to said attaching means, a battery in said unit having one side connected to said part of the unit, a flash lamp socket having one terminal connected to the other side of said battery, a second contact connected to the other terminal of said socket, means for detachably connecting said second contact to said shutter actuating member to move therewith into engagement with said first contact to close the lamp circuit in timed relation to the release of the shutter, said means including an element detachably connected directly to said member, said second contact connected to but insulated from said element and disposed to engage said first contact when said shutter actuating member is moved, and means for adjusting said second contact relative to the first contact for purposes of synchronization.

2. The combination with a camera having a reciprocal shutter actuating member extending from the interior thereof, a first contact extending from said camera adjacent said member and mounted to move relative to said camera, means normally acting on said contact to move it in one direction, and an attaching means on said camera and electrically connected to said first contact, of a flash lamp unit including a part engaging said attaching means for detachably mounting said unit on said camera body, and electrically connected to said attaching means, a battery in said unit having one side connected to said part of the unit, a flash lamp socket having one terminal connected to the other side of said battery, a second contact connected to the other terminal of said socket, means for detachably and adjustably connecting said second contact to said shutter actuating member to move therewith into engagement with said first contact to close the lamp circuit in timed relation to the release of the shutter, said means including an element detachably connected directly to said member, an insulating member adjustably connected to said element, said second contact fixed to, and insulated from said element by, said insulating member and disposed to engage said first contact when the shutter actuating member is moved to release the shutter.

3. The combination with a camera having a reciprocal shutter actuating member extending from the interior thereof, a first contact extending from said camera adjacent said member and mounted to move relative to said camera in the direction substantially parallel to the path of movement of said member, means normally acting on said first contact to move it in one direction, said contact mounted in said camera so as to be adjustable relative to said camera in the direction of its movement for synchronizing purposes, and an attaching means on one wall of said camera and electrically connected to said first contact, of a flash lamp unit detachably connected to said attaching means for mounting said unit on the camera, said flash lamp unit including a battery one side of which is grounded to said attaching means when the unit is mounted on the camera, a flash lamp socket having one terminal connected to the other side of said battery and spaced from, and directed away from, the wall of the camera on which the unit is mounted, a second contact connected to the other terminal of said lamp socket, means for detachably and adjustably mounting said second contact to said shutter actuating member to move therewith and into engagement with said first contact to close the lamp circuit in timed relation to the release of the shutter, said means including a threaded stud threadably engaging said shutter actuating member, said second contact insulated from and adjustably connected to said stud for adjustment relative to said first contact for synchronizing purposes, a bulb socket on said unit and directed toward the wall of the camera on which the unit is mounted and adapted to receive a low voltage bulb for illuminating said wall of the camera, said bulb socket connected in parallel with said flash lamp socket, and a normally open, manually operated, switch interposed in the circuit of said bulb socket for optionally turning on said bulb for illuminating purposes.

4. A flash lamp unit for detachable connection to a camera including a shutter actuating member, a first contact disposed adjacent said member, and an attaching means electrically connected to said first contact, said flash lamp unit comprising a casing adapted to be detachably connected to said attaching means, a battery in said casing one side of which is adapted to be grounded to said attaching means when the unit is in engagement therewith, a flash lamp socket integral with said casing and having one terminal connected to the other side of said battery, a second contact physically connected to said casing and electrically connected to the other terminal of said lamp socket, and means associated with said second contact for detachably connecting the same to said shutter actuating member to move therewith into engagement with said first contact when said member is operated.

5. A flash lamp unit for detachable connection to a camera including a shutter actuating member, a first contact disposed adjacent said member, and an attaching means electrically connected to said first contact, said flash lamp unit comprising a casing adapted to be detachably connected to said attaching means, a battery in said casing one side of which is adapted to be grounded to said attaching means when the unit is in engagement therewith, a flash lamp socket integral with said casing and having one terminal connected to the other side of said battery, a second contact physically connected to said casing and electrically connected to the other terminal of said lamp socket, means connected with said contact for detachably mounting the same to said shutter actuating member to move therewith into engagement with said first contact when said member is operated, and means for adjusting said second contact on said last mentioned means for the purpose of synchronizing the flashing of the lamp and release of the camera shutter.

6. A flash lamp unit for detachable connection to a camera including a shutter actuating member, a first contact disposed adjacent said member, and an attaching means electrically connected to said first contact, said flash lamp unit comprising a casing adapted to be detachably connected to said attaching means, a battery in said casing one side of which is adapted to be grounded to said attaching means when the unit is in engagement therewith, a flash lamp socket integral with said casing and having one terminal connected to the other side of said battery, a second contact physically connected to said casing and electrically connected to the other terminal of said lamp socket, means for detachably mounting said contact to said shutter actuating member to move therewith and providing for an adjustment of said contact relative to said first contact for the purposes of synchronizing the flashing of the lamp and release of the camera shutter, said means including an attaching member adapted to be detachably connected to said shutter actuating member to move therewith, and means for insulating the contact from, and adjustably mounting it on, said attaching member.

7. A flash lamp unit for detachable connection to a camera including a shutter actuating member, a first contact disposed adjacent said member, and an attaching means electrically connected to said first contact, said flash lamp unit comprising a casing adapted to be detachably connected to said attaching means, a battery in said casing one side of which is adapted to be grounded to said attaching means when the unit is in engagement therewith, a flash lamp socket integral with said casing and having one terminal connected to the other side of said battery, a second contact physically connected to said casing and electrically connected to the other terminal of said lamp socket, means for detachably mounting said contact to said shutter actuating member to move therewith and providing for an adjustment of said contact relative to said first contact for the purpose of synchronizing the flashing of the lamp and release of the camera shutter, said means including a threaded attaching stud adapted to be threadably connected to said shutter actuating member, and an insulating collar rotatably connected to said contact and in threaded engagement with said stud to permit adjustment of the collar along said stud, and means for locking said collar in any desired position of adjustment along said stud.

JOSEPH MIHALYI.